United States Patent Office 3,338,932
Patented Aug. 29, 1967

3,338,932
COLOR IMPROVEMENT OF OILS AND FATS OBTAINED THROUGH SOLVENT EXTRACTION
Robert W. Bates, Riverdale, and Joseph G. Endres, Downers Grove, Ill., assignors to Armour and Company, Chicago, Ill., a corporation of Delaware
No Drawing. Filed Sept. 16, 1963, Ser. No. 309,326
2 Claims. (Cl. 260—412.8)

This invention relates to color improvement of oils and fats obtained through solvent extraction, including vegetable, marine, and animal oils and fats, and those obtained from milk and milk products, eggs, poultry, fungi, and crustaceans.

Substantial advantages are obtained through the solvent extraction of substances, using both polar and non-polar solvents, and particularly through the use of low temperature extractions in which the original valuable food and therapeutic properties of the substance being treated are preserved. Various solvents, such as hexane, and other hydrocarbon solvents may be employed. Solvents such as ethylene dichloride, propylene dichloride, trichloroethylene, perchlorethylene, and other low boiling chlorinated solvents are very useful in carrying out azeotropic distillation of water from the substance being treated, the solvent being water-immiscible and the azeotrope boiling as low as 100° C. In the solvent extraction procedures, the color bodies of the original material are concentrated in a fraction, such as the fat fraction, and when the fat fraction is separated as a product, it is found that the concentrated color bodies render it highly objectionable because of its dark color condition, and the product is not acceptable for many purposes.

Unfortunately, the common and inexpensive conventional treatment used for bleaching such material, such as contacting with fuller's earth or other clays, is not effective. It may be that the solvent extraction process renders the color bodies non-polar and they therefore fail to respond to contact filtration with clays, etc. Further, water washing is found to be ineffective. Even caustic refining cannot be employed without prohibitive losses. The use of large amounts of hydrogen peroxide, such as is employed for bleaching purposes, tends to bring about oxidation of the oil and to impair the valuable food and therapeutic properties therein.

We have discovered that oils and fats obtained through solvent extraction can be effectively treated without impairment of the original food and therapeutic properties thereof through treatment with very small amounts of hydrogen peroxide and water, while at the same time modifying the color bodies as to their polar structure so that they respond to the use of conventional bleaching clays, etc.

A primary object, therefore, of the invention is to provide a process for the color improvement of oils and fats obtained through solvent extraction while retaining their original biological values unimpaired. A further object is to provide an improved process for the color improvement of oils and fats obtained through solvent extraction in which the removal of color bodies is accomplished with minimum losses. Other specific objects and advantages will appear as the specification proceeds.

In one embodiment of our invention, a fat or oil obtained through solvent extraction is heated to render the material thereof fluid and mixed with 0.05 to 1.2 percent of 100 percent hydrogen peroxide, based on the weight of the oil or fat material, and preferably in about 1 to 10 percent of water (based on the weight of oil or fat), the mixture being agitated and then allowed to settle. The color bodies are found to become insoluble and are removed from the liquid body by any suitable means, such as decantation of the liquid, filtering, centrifugation, etc.

The foregoing process further has the advantage of rendering the remaining color bodies, etc., polar in character, and the oil or fat responds readily to conventional treatment with bleaching clays, etc. As a final step, therefore, in the treatment of the oil or fat material, after separation from the color bodies referred to above, we prefer to subject the material to contact filtration with fuller's earth or other bleaching clays.

In the foregoing process, it is found that the losses are substantially under 5 percent. The resulting fat or oil can be sold at a much higher price because of its improved color.

Specific examples of the process may be set out as follows:

Example I

Animal tissue was subjected to azeotropic rendering and distillation by introducing it into a boiling vat of ethylene dichloride, and the recovered fat was found to be very dark in color and was unsaleable because of such color. Normal water washing removed only a small amount of the color bodies and was ineffective. Adding from about 0.3 to 2.0 percent of 30 percent hydrogen peroxide (based on the weight of the oil) along with water (1 to 10 percent based on the weight of the oil), resulted in a marked color reduction. Apparently, the use of a small amount of the oxidizing agent oxidized the pigment, making it insoluble in the tallow or oil but having no tendency to oxidize the oil.

The following table, in which FFA indicates "free fatty acids" and the letters FAC indicate "Fat Analysis Committee of the American Oil Chemists Society," sets out results of the process and also comparative results with water washing:

TABLE 1

| | Apparent (FFA), Percent | Color (FAC) |
|---|---|---|
| (1) Original tallow | 1.04 | 45+ |
| (2) Water washed with 3% water based upon weight of oil | 0.51 | 21 |
| (3) Treated with 0.3% of 30% hydrogen peroxide (based upon weight of oil) in water (3% based upon weight of oil) | 0.51 | 9 |
| (4) Treated with 0.6% based upon weight of oil of 30% hydrogen peroxide in water (3% based upon weight of oil) | 0.51 | 9 |
| (5) Treated with 1.0% of 30% hydrogen peroxide (based upon weight of oil) in water (3% based upon weight of oil) | 0.51 | 7 |
| (6) Treated with 2.0% of 30% hydrogen peroxide (based upon weight of oil) in water (3% based upon weight of oil) | 0.51 | 7 |

In the above processes using hydrogen peroxide, the losses were well under 5 percent. In the process, the tallow was merely heated to 160° F., and the water and peroxide added with rapid agitation for 10 minutes, followed by slow agitation for 5 minutes. The foots were settled at 120° F. and removed by filtration through filter paper.

Example II

The process was carried out as described in Example I on blood and using the solvent extraction procedure described in Example I. The fat was found to be exceptionally dark and it did not respond to water washing or clay bleaching. Caustic refining was effective only with prohibitive losses. The dark colored material responded to the use of 0.09 percent of 100 percent hydrogen peroxide based on the weight of the oil in about 5 percent water (based on the weight of the oil). The settled color bodies were removed, and the oil was subjected to contact filtration with fuller's earth to provide a product having its natural color.

While in the foregoing specification we have set out specific procedure in considerable detail for the purpose of illustrating embodiments of our invention, it will be understood that such detail or details may be varied widely by those skilled in the art without departing from the spirit of our invention.

We claim:

1. In a process in which a color body containing material selected from the group consisting of animal tissue and blood is subjected to azeotropic rendering by boiling the same in a polar solvent which concentrates said bodies as dark color bodies in a fat fraction and renders said bodies non-polar and non-responsive to bleaching clays, the fat fraction being separated from said material, the improvement which comprises heating said fat fraction to render the fraction liquid, adding about 0.05–1.2 weight percent of 100 percent hydrogen peroxide along with about 1–10 percent of water based on the weight of said fat to render said color bodies polar, agitating the mixture, allowing the mixture to cool and the dark color bodies to settle, removing the settled material containing said dark color bodies from said fat fraction, and filtering said fat fraction containing the remaining color bodies which are now polar in character with bleaching clay to remove said remaining color bodies.

2. The process of claim 1 in which the water added is about 3–10 percent based on the weight of the fat.

References Cited

UNITED STATES PATENTS

| | | | |
|---|---|---|---|
| 2,204,109 | 6/1940 | Thurman | 260—423 |
| 2,468,753 | 5/1949 | Henderson et al. | 260—423 |
| 2,524,056 | 10/1950 | Jespersen | 260—423 |
| 2,752,377 | 6/1956 | McDonald | 260—412.8 |

ALEX MAZEL, *Primary Examiner*.

CHARLES B. PARKER, HENRY R. JILES, *Examiners*.

A. H. SUTTO, RAY BOYD, *Assistant Examiners*.